United States Patent
Eckert et al.

(10) Patent No.: US 9,008,937 B2
(45) Date of Patent: Apr. 14, 2015

(54) METHOD AND CONTROL DEVICE FOR OPEN-LOOP OR CLOSED-LOOP CONTROL OF A VEHICLE BRAKE SYSTEM

(75) Inventors: Horst Eckert, Rehburg-Loccum (DE); Arnd Gaulke, Wennigsen (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 14/235,296

(22) PCT Filed: Jun. 9, 2012

(86) PCT No.: PCT/EP2012/002449
§ 371 (c)(1),
(2), (4) Date: Jan. 27, 2014

(87) PCT Pub. No.: WO2013/026503
PCT Pub. Date: Feb. 28, 2013

(65) Prior Publication Data
US 2014/0188363 A1 Jul. 3, 2014

(30) Foreign Application Priority Data
Aug. 25, 2011 (DE) .......................... 10 2011 111 592

(51) Int. Cl.
*B60T 8/172* (2006.01)
*B60T 8/1766* (2006.01)
*B60T 8/26* (2006.01)

(52) U.S. Cl.
CPC ............... *B60T 8/172* (2013.01); *B60T 8/1766* (2013.01); *B60T 8/266* (2013.01); *B60T 2210/12* (2013.01); *B60T 2210/36* (2013.01)

(58) Field of Classification Search
USPC ......................................................... 701/70
See application file for complete search history.

(56) References Cited

U.S. PATENT DOCUMENTS

| | | | |
|---|---|---|---|
| 6,312,065 B1 * | 11/2001 | Freitag et al. ................. | 303/187 |
| 8,332,113 B2 * | 12/2012 | Yasui et al. ..................... | 701/70 |
| 8,352,142 B2 * | 1/2013 | Nishida .......................... | 701/70 |
| 2004/0204812 A1 | 10/2004 | Tran | |
| 2005/0125134 A1 * | 6/2005 | Iwatsuki et al. ............... | 701/70 |
| 2005/0221603 A1 | 10/2005 | Morad et al. | |
| 2008/0255744 A1 * | 10/2008 | Yasui et al. .................... | 701/70 |

FOREIGN PATENT DOCUMENTS

| | | |
|---|---|---|
| DE | 40 22 671 A1 | 1/1992 |
| DE | 43 26 256 A1 | 12/1994 |
| DE | 195 17 708 A1 | 11/1996 |
| DE | 101 26 459 C1 | 1/2003 |
| DE | 101 63 678 A1 | 7/2003 |
| DE | 10 2004 018 088 A1 | 2/2005 |
| DE | 10 2008 032 544 A1 | 2/2009 |
| DE | 10 2007 060 858 A1 | 6/2009 |
| EP | 1 635 163 A2 | 3/2006 |

\* cited by examiner

*Primary Examiner* — Thomas Tarcza
*Assistant Examiner* — Alex C Dunn
(74) *Attorney, Agent, or Firm* — Kramer Levin Naftalis & Frankel LLP

(57) ABSTRACT

A method for carrying out closed-loop or open-loop control of a vehicle brake system includes, when a braking request signal is present, setting brake pressures at brakes on axles and/or wheels of the vehicle by distributing brake pressure. Before braking is initiated on the basis of current, received or detected data relating to friction conditions or grip conditions between the roadway surface and tire surfaces of the vehicle, a determination is made as to whether, or to what extent, the distribution of brake pressure occurs in a brake wear pressure distribution or in a frictional engagement pressure distribution for the subsequent initiation of the braking process.

15 Claims, 4 Drawing Sheets

METHOD AND CONTROL DEVICE FOR OPEN-LOOP OR CLOSED-LOOP CONTROL OF A VEHICLE BRAKE SYSTEM

FIELD OF THE INVENTION

The invention generally relates to a method and control device for open-loop or closed-loop control of a vehicle brake system.

BACKGROUND OF THE INVENTION

DE 10 2008 032 544 A1 describes setting braking forces at the vehicle wheels or axles as a function of brake temperature and of wheel slip values. As a result, braking force distribution takes place on the basis of the slip values, i.e., closed-loop adhesion control.

Different closed-loop control systems are known for brake systems of utility vehicles. Closed-loop slip control systems such as ABS and traction control systems serve to prevent and/or to regulate locking of the braked wheels and spinning of the driven wheels. Driving stability control systems such as ESP and rolling prevention functions serve to prevent skidding and rolling (lateral tipping over) of the vehicle. Longitudinal control systems such as cruise control (CC) functions and adaptive cruise control (ACC) systems relate to adaptation to other road users. Furthermore, brake lining wear control systems are known for bringing about the most uniform possible brake lining wear at the different wheels or axles.

In the event of a braking request by the driver or by one of the stability programs, the overall brake pressure that is determined or the overall braking force that is determined can be distributed differently between the axles of the vehicle. This brake pressure distribution or braking force distribution is carried out, in particular, in an axle-dependent fashion in order to take into account the various axle loads, since a large axle load permits greater traction and better transmission of the braking force to the roadway. This is intended to prevent, in the event of such adhesion-appropriate braking force distributions (BKV) or brake pressure distributions (DV or phi), the braked axles with relatively small axle loads from locking too quickly. A relatively large degree of brake lining wear at the axles that have a relatively large axle load is disadvantageous, and therefore, in the case of adhesion-appropriate braking force distributions or brake pressure distributions, such axles are allocated a higher braking force or brake pressure.

On the other hand, when brake lining wear control operations are carried out, frequent locking of the axle that has a relatively low axle load and is actuated with a high brake pressure can take place. For example, in buses, this axle with a tendency to lock is generally the front axle, the locking of which can be perceived as unpleasant by the driver and the passengers; in the case of empty trucks and semitrailer tractors traveling solo, this axle with a tendency to lock is generally the rear axle; driving stability is also adversely affected here.

Furthermore, measurements of ambient conditions are known, for example, from DE 10 2004 018 088 A1, DE 10 2007 060 858 A1, EP 1 635 163 A2 and DE 101 26 459 C1.

SUMMARY OF THE INVENTION

Generally speaking, it is an object of the present invention to provide a method and control device for open-loop or closed-loop control of a brake system, which permit reliable operation of the brake system with advantageous distribution of brake lining wear.

The present invention is based on the concept of deciding, at a particular time, before the initiation of braking, whether an inter-axle distribution of braking force or distribution of brake pressure is to take place:

a) on the basis of a brake lining wear-pressure distribution, i.e., in order to homogenize the brake lining wear on the various axles and/or wheels, or b) on the basis of a grip-pressure distribution, i.e., as an adhesion-oriented distribution of brake pressure (distribution of braking force), or preferably, c) on the basis of both the brake lining wear-pressure distribution and the grip-pressure distribution.

The term "initiation of braking" is understood to mean application of pressure to the brakes that have not been activated until then. As a result, the term "before initiation of braking" is understood to mean that the setting of the pressure ratios is determined before brake pressure is applied to the brakes.

In each alternative a) to c), the overall braking torque or the setpoint vehicle deceleration that corresponds to the braking request signal is preferably set. As a result, the setting of the pressure ratios relates to the distribution of the requested brake pressure or of the requested braking effect to the various axles or wheels.

This decision between the at least two, preferably three, cases is decided at present on the basis of the determined frictional conditions or grip conditions, and the braking is then effected on the basis of the alternative selected.

The frictional conditions or grip conditions between the roadway surface and the tire surface, which are determined in advance from data/signals, can occur by means of a scalar coefficient of friction or else, for example, by means of classes or quality gradations, which therefore also take into account adverse effects on the adhesion or grip as a result of boulders, snow, ice, moisture etc. It is therefore possible that, instead of a scalar coefficient of friction, classification occurs in a plurality of classes, for example from grip class 1 (poor grip) to grip class n (best grip) with n as a natural number.

Owing to the data and/or signals that are present, a decision is taken at a particular time as to which of the two or three pressure distribution variants or braking force distribution variants a), b) and, if appropriate, c) is to be carried out at a particular time. This decision can therefore be taken in a different way during successive braking operations if the current data give rise to different results.

It is therefore already possible in advance of a braking operation for adhesion-appropriate or more adhesion-appropriate brake pressure distribution (braking force distribution) to be implemented as a function of the ambient conditions when there is a low coefficient of friction between the roadway and the wheel. In the case of more adhesion-appropriate brake pressure distribution (braking force distribution), a relatively high brake pressure is therefore preferably applied to axles with a relatively high axle load; this is often the rear axle of a laden utility vehicle even if this results in greater brake lining wear of the brake linings of the rear axle, which are already generally loaded to a greater extent owing to relatively poor cooling.

On the other hand, if the coefficient of friction permits, i.e., a determined coefficient of friction between the tire surface and the roadway is sufficiently large, it is possible to carry out the brake pressure distribution (braking force distribution) of the brake lining wear-pressure distribution instead of the adhesion-appropriate or more adhesion-appropriate brake pressure distribution (braking force distribution).

In order to decide between these two cases a) and b), the detected (scalar) coefficient of friction can be compared with a threshold or a limiting value. In this context, it is also possible to set a lower threshold and an upper threshold between which a transition region is formed.

Combined methods according to possibility c) can use, for example, mean values of the brake pressure values obtained from a) and b), i.e., for example, with a weighting of 50-50 or 60-40, depending on the class.

The advantage arises that, at a particular time, it is possible to avoid overbraking and therefore intervention by an ABS controller at the axle with the relatively low axle load, which is often the front axle in the case of a bus, for example, but, nevertheless, good homogenization of the brake lining wear is possible over relatively long time periods.

It is therefore possible, in contrast to, for example, DE 10 2008 032 544, to initiate adhesion-appropriate or more adhesion-appropriate braking before the braking and before a slip or differential slip is exceeded, and not only after a brake slip has been detected.

As a result, various roadway conditions can be determined. It is therefore possible for the roadway surface to be checked in terms of moisture, snow, ice, temperature and further properties and conditions using, for example, a roadway detector. Additionally or alternatively, it is also possible to determine such roadway properties on the basis of meteorological data received, for example, by radio or GPS. Furthermore, it is also possible, for example, to use a vehicle camera system to detect fog, snow or ice, and, furthermore, meteorological conditions can be detected from the ambient temperature and, under certain circumstances, a rainwater sensor on the surface of the windshield.

Additionally, data relating to the route lying ahead from a navigation system can also be used. As a result, for example, a route section with a negative gradient can be detected, and more adhesion-appropriate pressure distribution, instead of the brake lining wear-pressure distribution, selected in advance, even if, under certain circumstances, the current coefficient of friction is high and therefore would permit a brake lining wear-pressure distribution.

After initiation of braking on the basis of a suitable selection of the brake pressure distribution, the braking process itself can then be carried out, for example, as a closed-loop control process, in known manner.

The inventive method can be self-learning, with the result that the selection of the alternative can be improved automatically. In particular, it is possible to determine from a subsequent braking operation whether the selection of the detection method taken before the initiation of braking can be improved under certain circumstances. If it is detected, for example, that an excessively high tendency to lock occurs with a brake lining wear-pressure distribution, it is subsequently possible even at relatively high coefficients of friction to select a grip-pressure distribution and/or increase the proportion thereof.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

The invention is explained in greater detail below using exemplary embodiments and with reference to the appended drawings, in which.

LISTING OF REFERENCE CHARACTERS

Figure 4:
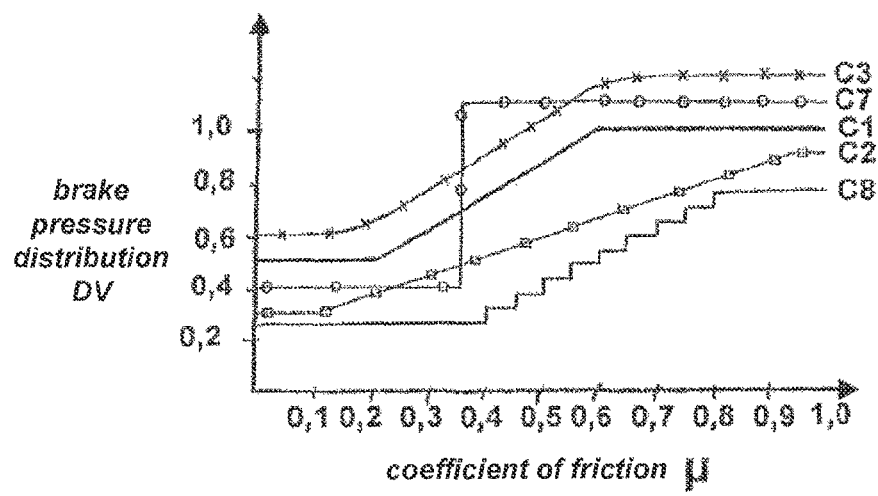
FIG. 4 shows various embodiments for determining the pressure distribution in the case of a relatively high axle load at the rear axle.
Figure 5:
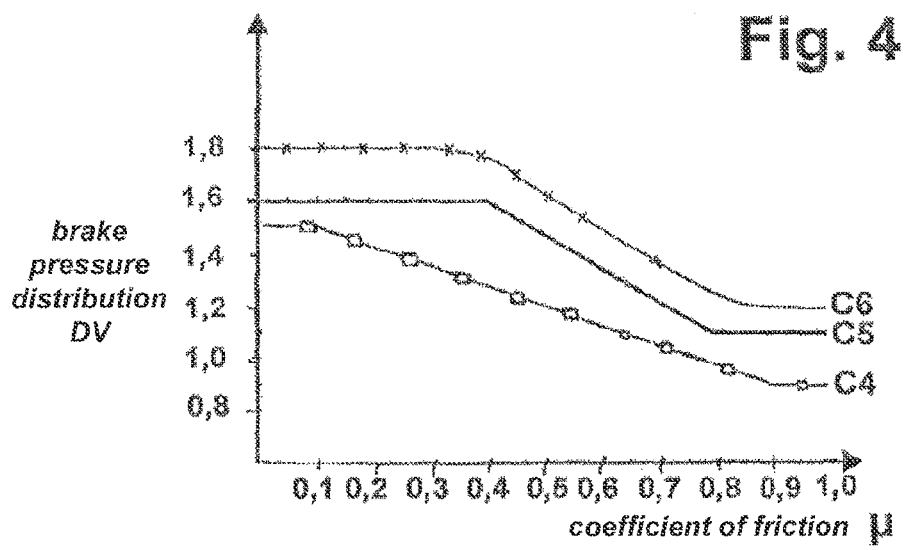
FIG. 5 shows various embodiments for determining the pressure distribution in the case of a relatively high axle load at the front axle.

1 Vehicle
2 Roadway
2a Roadway surface
3 Front wheels
3a Tire surface
4 Rear wheels
4a Tire surface
5 Brake system
6 Control device
8 Front wheel brakes
9 Brake valve devices
10 Rear wheel brakes
12 Brake valve devices
14 Rotational speed sensors
15 Rotational speed sensors
17 Brake pedal
18 Brake value signal transmitter
20 Vehicle dynamics control device
21 Navigation device
22 GPS receiver
23 Map memory
30 Roadway detector
32 Covering
34 Temperature sensor
S1 Brake control signals
S2 Brake control signals
S3 Rotational speed measurement signals
S4 Rotational speed measurement signals
S5 Braking request signal
S6 Braking request signal
S7 Route signals
S8 Roadway measurement signals
S9 Temperature measurement signals
DV Pressure distribution
HA Rear axle
IR IR beams
GPS GPS signals
VA Front axle
μ Coefficient of friction
St0-St6 Method steps
cl1, cl2, cl3 Classes
C1-C8 Curves in FIGS. 4 and 5
RP Grip-pressure distribution
BVP Brake lining wear-pressure distribution

DETAILED DESCRIPTION OF THE PREFERRED EMBODIMENTS

The vehicle 1, which is embodied as a utility vehicle, travels on a roadway 2 with a roadway surface 2a. The vehicle 1 is shown here by way of example with two axles and has a front axle VA with front wheels 3 and a rear axle HA with rear wheels 4. The front wheels 3 each have a tire surface 3a, and, correspondingly, the rear wheels 4 each have a tire surface 4a, in contact with the roadway surface 2a. The vehicle 1 has a pneumatic brake system 5, which has, inter alia, a control device (ECU) 6, front wheel brakes 8 and electropneumatic brake valve devices 9, rear wheel brakes 10 and electropneumatic brake valve devices 12, as well as rotational speed sensors 34, 15 for outputting rotational speed measurement signals S3, S4. Further components, which are known, can include a compressed air supply system, a multi-circuit valve protection device, and a compressed air accumulator.

The brake valve devices 9 and 12 are illustrated in simplified form and can also contain relay valves. The control device 6 actuates the brake valve devices 9 and 12 by means of electrical brake control signals S1 and S2. As a result, brake pressure can be individually applied, i.e., under certain conditions in respective different ways on the right and the left, in the front wheel brakes 8 of the front axle VA and in the rear wheel brakes 10 of the rear axle HA.

A pneumatic fall back level may be present, under certain circumstances, for permitting pneumatic control of the brake system 5 in the event of failure of the electronics.

Furthermore, the brake system 5 has a brake pedal 17 with a brake value signal transmitter 18 and, preferably, a vehicle dynamics control device 20, which can, under certain circumstances, also be integrated into the control device 6. The driver inputs a deceleration request as a braking request signal S5 via the brake pedal 17 and the brake value signal transmitter 18, from which the control device 6 determines a setpoint deceleration and subsequently carries out a deceleration control process.

The vehicle dynamics control device 20 can comprise, for example, an APS, an ESP (electronic stability program) or a traction control system for braking the driven wheels 4 of the rear axle HA and/or a rolling stability function for preventing lateral tipping over and/or an adaptive cruise control system (ACC) and/or a cruise control (CC) function, and outputs braking request signals S6 to the control device 6.

Furthermore, a navigation device 21, having a GPS receiver 22 for receiving GPS signals and a map memory 23 (or, correspondingly, a device for the wireless reception of map data), which outputs up-to-date route signals S7 to the control device 6 is provided in the vehicle 1. As a result, the control device 6 can take into account, from the map data, the profile of the roadway 2 in front of the vehicle 1, in particular, in relation to the positive gradient, negative gradient, bends, geographic positions such as, for example, mountains, altitude or altitude profile, current temperature data and, if appropriate, data related to the use of the roadway 2 for the corresponding time of day and calendar date.

Furthermore, the vehicle 1 has a roadway detector 30 that detects, for example by means of IR radiation, the condition of the roadway surface 2a, for example, with respect to a covering 32, which may be, for example, water or ice or snow. The roadway detector 30 outputs roadway measurement signals S8 to the control device 6. Furthermore, for example, a temperature sensor 34 is provided, which outputs temperature measurement signals S9 to the control device.

The control device 6 can also be divided into individual control devices that interact with one another, with respect to the individual functionalities.

The control device 6 carries out axle-load-dependent brake pressure distribution (braking force distribution, BKV) to the front axle VA and rear axle HA. The brake pressure distribution takes into account, in each case, the axle loads, i.e., the loading of the front axle VA and rear axle HA, which are determined by axle load sensors and/or adaptively by learning, during travel, on the basis of the behavior of the wheels 3 and 4 or brakes 8 and 10 of the front axle VA and of the rear axle HA. The brake pressure distribution therefore takes into account axle loads, and the entire vehicle mass, under certain circumstances also, for example, traction control processes and/or ABS control processes also occurring briefly beforehand at the axles HA and VA.

Furthermore, the control device 6 can operate various modes tor braking force distribution and brake pressure distribution.

According to a first mode, a pure brake lining wear-pressure distribution is carried out to provide the most uniform possible wear of the brake linings of the wheel brakes 8 and 10. This mode is carried out, in particular, if the control device 6 detects that a sufficiently high coefficient of friction $\mu$ is present between the roadway surface 2a and the tire surfaces 3a and 4a, i.e., for example when a first threshold $\mu 1$ is exceeded, that is, $\mu > \mu 1$.

On the other hand, if the control device 6 detects that the coefficient of friction is or may be critical or very low, a pure grip-pressure distribution RP is carried out instead of a brake lining wear-pressure distribution. Preferably, this takes into account the axle loads of the front axle VA and of the rear axle HA, and, by means of the electrical brake control signals S1 and S2, the ("relatively heavy") axle, for example the rear axle HA, which is loaded with a relatively large axle load, is actuated with a higher brake pressure than the other axle VA.

Basically, subdivision into these two cases is possible, i.e., either pure brake lining wear-pressure distribution BVP or a pure grip-pressure distribution RP. As a result, a single threshold can be set and the subdivision into $\mu > \mu 1$ or therefore $\mu \leq \mu 1$ can be selected.

However, subdivisions into a plurality of classes are also possible, i.e., mixed forms in which, for example, a brake pressure portion of the axle with a relatively high axle load is incrementally increased as the coefficient of friction $\mu$ increases, and, correspondingly, a brake pressure proportion of the axle with a relatively low axle load is reduced. It is therefore possible to set a plurality of thresholds and/or rough estimates of the relevant states for the classification.

FIGS. 4 and 5 illustrate a number of methods as according to embodiments of the present invention.

In each case, a pressure distribution DV, which represents, for example, the ratio of the brake pressure at the front axle to that at the rear axle, is shown on the vertical ordinate. As the value of the pressure distribution DV increases, the proportion of the brake pressure at the front axle also increases.

The coefficient of friction $\mu$ is shown on the horizontal abscissa, and therefore increases to the right. However, instead of the coefficient of friction $\mu$, it is also possible to set various grip classes with grip behavior that increases to the right, grip qualities or grip classes; such information can therefore also describe, for example, an underlying surface with boulders, pebbles, snow, ice, water, etc.

This results in each case in a region on the far left with a low coefficient of friction or grip, in which a pressure distribution according to grip criteria is therefore set, and on the far right a region with a very good coefficient of friction or grip, in which a pressure distribution according to lining wear criteria is therefore set. Regions with a medium coefficient of friction or grip lie, respectively, between the two.

FIG. 4 illustrates methods for the case in which the pressure distribution DV_RP for a grip-pressure distribution (grip setting) is lower than a pressure distribution DV_BVP for a lining wear-pressure distribution (lining wear homogenization), i.e.:

$$DV\_RP < DV\_BVP$$

FIG. 4 therefore corresponds to the case that, in the case of brakes or brake configurations that are installed in the same way or an equivalent way, the axle load of the front axle is currently lower than the axle load of the rear axle, such as can occur, for example, in the case of a bus without passengers or a sufficiently laden truck.

C7 shows the curve for a selection between the alternatives of either grip-pressure distribution or brake lining wear-pressure distribution, i.e., a step function without a central transition region. In the case of low values of μ, a grip-pressure distribution is therefore carried out with a low pressure distribution DV, and when a limiting value of μ, is exceeded, the brake lining wear-pressure distribution is then carried out directly.

Furthermore, a stepless transition between a pure brake lining wear-pressure distribution (DV_BVP) and a grip-pressure distribution (DV_RP) is possible. As the detected coefficient of friction μ rises between a lower coefficient of friction μ, for example 0.2, and an upper coefficient of friction μ, for example 0.6, change occurs in an infinitely variable fashion between the pressure distribution according to the grip-pressure distribution RP, valid in the case of detected coefficients of friction μ of less than or equal to 0.2, and the pressure distribution of the brake lining wear-pressure distribution DVP, valid in the case of detected coefficients of friction μ of greater than or equal to 0.6.

Instead of the lower coefficient of friction μ of 0.2, a lower value of, for example, 0.1 or 0.3 is also possible, and, instead of the upper coefficient of friction of 0.6, an upper coefficient of friction μ of, for example, 0.5 or 0.8 is possible.

In this context, the stepless transitions between the pressure distributions DV_RP and DV_BVP can be of a linear type, i.e., can be determined by means of an interpolation according to C1 and C2, in the case of which a linear interpolation between the upper value of the pressure distribution DV and the lower value of the pressure distribution DV is formed in the case of medium coefficients of friction μ. This, however, corresponds to an approach with an upper and a lower threshold of the coefficient of friction μ.

Furthermore, it is also possible to set a different mathematical function that causes the transition to take place in a continuously differentiable or sliding harmonic fashion, as is illustrated, for example, in the curve C3.

Stepped transitions, for example corresponding to curve C8 in FIG. 4, are also possible.

FIG. 5 shows curves C4, C5 and C6 for the case DV_RP>DV_BVP. FIG. 5 therefore represents a driving state in which the front axle load is higher than the rear axle load such as can occur, for example, in the case of a truck that is empty or lightly laden. In this context, C4 and C5 represent linear transitions and C6 represents a harmonic or smooth (continuously differentiable) transition.

According to an embodiment of the present invention, driving states in which the pressure ratios that are to be set do not differ for the cases of grip-pressure distribution RP and brake lining wear-pressure distribution DVP, do not give rise to any faults or disadvantages; the curves in FIG. 4 and FIG. 5 become horizontal straight lines if the functional values on the left-hand and right-hand ends approximate to one another.

Figure 1:
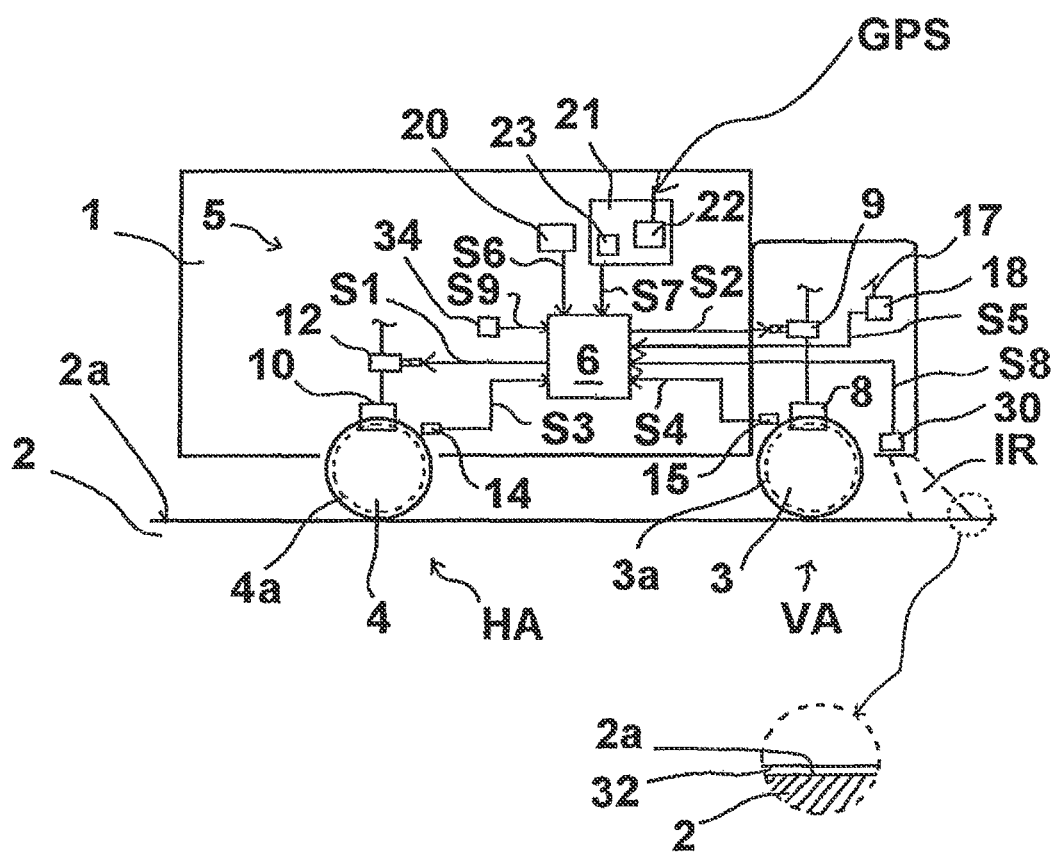
FIG. 1 shows a vehicle including a brake system according to an embodiment of the present invention.

The control device 6, which is shown in FIG. 1, determines coefficients of friction μ between the roadway surface 2a and the tire surfaces 3a and 4a. The control device 6 advantageously has knowledge about the tire surfaces 3a and 4a, for example from a tire profile measurement (profile sensors), if appropriate under certain circumstances, also from data of the previous driving performance of the wheels 3 and 4, but, in particular, also from knowledge of the previous brake slip behavior of the wheels 3 and 4. Basically, the evaluation of the coefficient of friction can also be made, however, without more precise knowledge of the tire surfaces 3a and 4a; in this case, the roadway surface 2a is taken into account.

The detection of the roadway surface 2a can be made directly by means of the roadway detector 30 if one is provided. Furthermore, the roadway surface 2a can also be estimated, in addition to or instead of the roadway detector 30, on the basis of the ambient temperature determined by means of the temperature measurement signals S9, since coefficients of friction between two materials such as asphalt and rubber are temperature-dependent and, in particular, in the case of frost, lower coefficients of friction have to be set, also by means of meteorological data received by means of remote data transmission, for example, via the GPS receiver 22, or else radio signals. Furthermore, the surroundings of the roadway can be detected, for example by means of a camera with which, if appropriate, fog, snowfall and rain can be detected. Furthermore, by using a rain detector for detecting raindrops on the surface of the windshield, it is possible to detect a wet roadway surface 2a.

An adhesion-appropriate or more adhesion-appropriate braking force distribution or brake pressure distribution for loading an axle with a higher axle load than the other axle can therefore be set if a low coefficient of friction μ is detected between the wheel surface 3a, 4a and the roadway surface 2a and/or downhill travel with a relatively long distance and/or a winding road are detected from the map data and the received GPS signals, if appropriate taking into account the poor state of the roadway surface 2a (poor state of asphalt, gravel track), which can be detected from the map data. In such cases, purely adhesion-appropriate or more adhesion-appropriate braking force distribution or brake pressure distribution is set, i.e. a pressure distribution that is adapted more to the grip conditions is set for the subsequent braking process.

In the case of classification into a plurality of classes, the brake pressure proportion can be changed correspondingly. For example, the brake pressure distributions of both pure modes, i.e., of the pure grip-pressure distribution (adhesion-pressure distribution, coefficient of friction-pressure distribution) and pure brake lining wear-pressure distribution, can be determined. The difference with respect to the brake pressure at the axle with the high axle load can be determined in the two modes and incrementally distributed to the classes, i.e., in the case of three classes, the medium class receives 50% of the difference assigned to it. The brake pressure at the axle with the high axle load is therefore at the medium value of the two pure modes. The corresponding procedure is adopted in the case of relatively fine gradations. It is therefore possible to form, for example, classes with 10% to 90% adhesion-pressure distribution (grip-pressure distribution) between the pure modes (i.e., a 0% class and a 100% class are formed).

Estimations from the further sensors and received weather data can be included in the classification. For example, in the case of a prediction of bad weather and/or a detected risk of frost and/or a relatively long negative gradient, a class can be categorized more closely to the pure adhesion-pressure distribution (grip-pressure distribution).

It is possible to form a continuous gradation, i.e., to form a continuous value instead of specific classes. Therefore, an infinitely large number of classes or a continuum is formed.

By way of example, the vehicle (FIG. 1) is a two-axle bus. Without passengers, i.e., in the empty state, the axle load of the front axle (VA) is 3.5 t and the axle load of the rear axle (HA) is 7 t, and the front axle is therefore the axle with the low axle load, and the rear axle is the axle with the high axle load. Brakes of the same magnitude and likewise brake cylinders of the same size are installed on the front axle and on the rear axle. During a braking process, longitudinally dynamic influences, i.e., influences of the deceleration-dependent shifting of the center of gravity of the vehicle, in the direction of the front axle during forward travel, are not to be taken into account.

For a grip-pressure distribution (adhesion-pressure distribution), the objective is to bring about the same slip conditions at the front axle (VA) and rear axle (HA) and, therefore, a differential slip (ds) between the front axle and the rear axle of zero. In order to achieve this objective, the brake pressures at the front axle and rear axle must behave proportionally to the axle loads, and therefore the following applies:

$$DV\_RP = p\_Setp\_VA/p\_Setp\_HA \sim \text{Axle load}\_VA/\text{Axle load}\_HA = 3.5 \text{ t}/7 \text{ t} = 0.5$$

For the brake lining wear-pressure distribution (BVP), the objective is to bring about the same brake lining wear at the front axle and rear axle. When the same brakes are installed at the front axle and the rear axle and an inequality of wear has not yet occurred, the same brake pressures must therefore be modulated at the front axle and rear axle. The following therefore applies:

$$DV\_BVP = p\_Setp\_VA/p\_Setp\_HA = 1.0$$

Preferably, in the case of coefficients of friction of the roadway/tires $\mu$ of less than 0.2, the brake pressure distribution or braking force distribution of the pure grip-pressure distribution (RP) is applied, and, in the case of coefficients of friction of the roadway/tires $\mu$ of greater than 0.6, the pure brake pressure distribution or braking force distribution of the brake lining wear-pressure distribution (BVP) is always applied, and interpolation is carried out between them as a function of the coefficient of friction in an infinitely variable fashion.

This variant of the coefficient-of-friction-dependent brake pressure distribution is illustrated on the curve C1 in FIG. 4.

Figure 2:
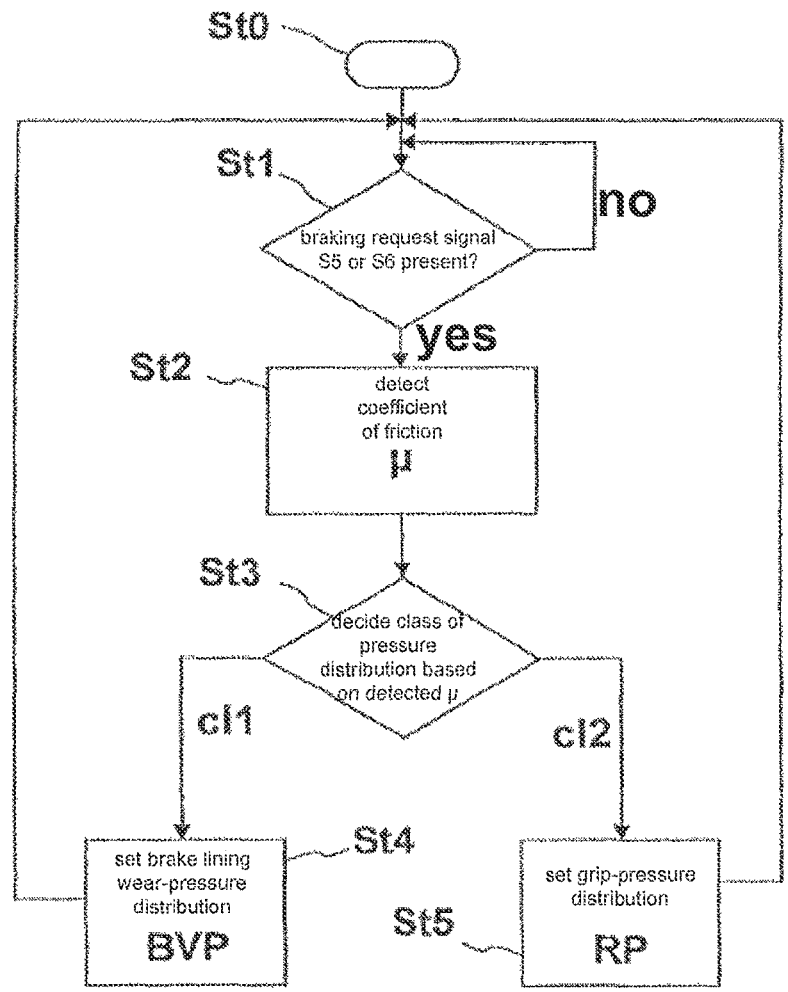
FIG. 2 is a flowchart illustrating a method according to an embodiment of the present invention.

The embodiment of the inventive method illustrated in FIG. 2 shows a subdivision into two classes. The process starts at St0 when the brake system 5 is activated, i.e., generally, when the engine starts. According to step St1, a determination is made as to whether a braking request signal S5 or S6 is input by the driver and/or by the vehicle dynamics control device 20, illustrated here as the Boolean value "S5=1 OR S6=1?" with the Boolean logic operator OR. If this is not the case, according to the branch n, the method is reset to before step St1.

When a braking request is present, i.e., S5= and/or S6=1, according to the branch y in step St2, the roadway surface or the coefficient of friction $\mu$ between the roadway surface 2a and the tire surfaces 3a, 4a is subsequently detected. In step St3, a decision is made as to whether, according to the branch cl1, a first class is selected according to which, in step St4, a brake lining wear-pressure distribution BVP is set in order to bring about uniform wear, or, according to the branch cl2, a second class is selected according to which, in step St5, an adhesion-appropriate brake pressure distribution is set as RP (grip-pressure distribution). As a result, in steps St4 and St5, open-loop or closed-loop brake control operations of the wheel brakes 8 and 10 are correspondingly carried out, in each case, having superimposed on them the corresponding further incoming control functions such as ABS, ESP and also, under certain circumstances, longitudinal control operations such as ACC, etc. In this context, safety-relevant, wheel-specific brake control operations such as ABS and ESP can generally have priority over a brake lining wear control operation.

In both cases, the method is reset to before step St1 below.

Figure 3:
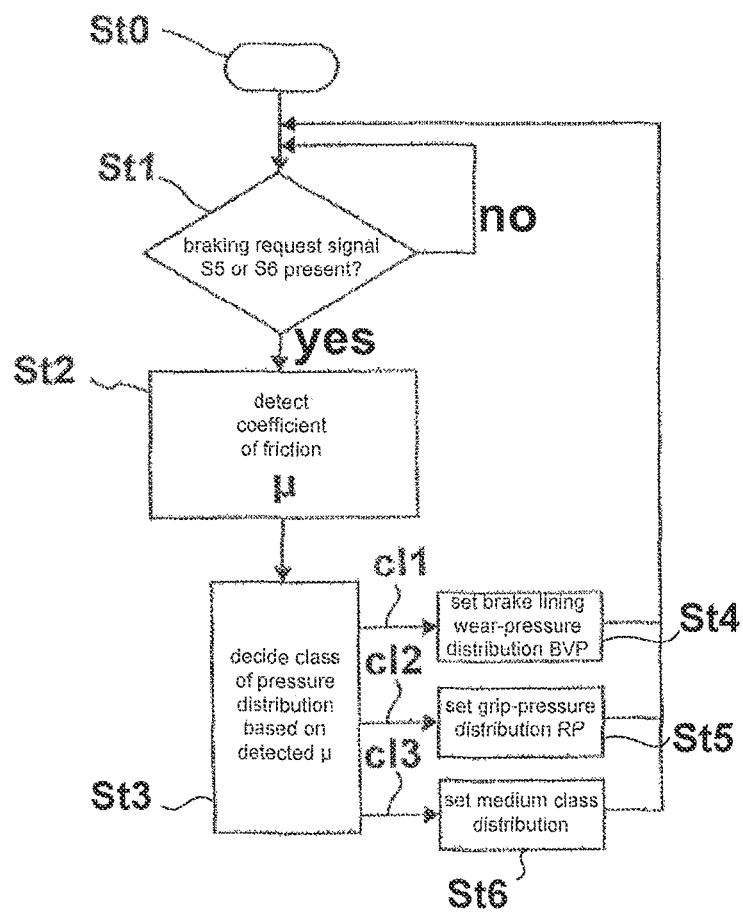
FIG. 3 is a flowchart illustrating a method according to a further embodiment of the present invention.

FIG. 3 shows a corresponding classification into three classes cl1, cl2 and cl3, wherein cl1 and cl2 correspond to the classifications of FIG. 2, and the medium class cl3 subsequently sets, in step St6, a pressure distribution in which the brake pressure of the heavy axle HA is increased with respect to cl3 and reduced with respect to cl2.

The pressure distributions also have superimposed on them the corresponding further incoming control functions such as ABS, ESP here, and also, in certain circumstances, longitudinal control operations such as ACC.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A method for controlling a brake system of a vehicle, the method comprising determining when a braking request signal is present; when a braking request signal is present and before initiating braking, using at least one data processor associated with the vehicle to determine, based on a comparison of a threshold coefficient of friction with data concerning frictional conditions between a roadway surface and tire surfaces of the vehicle, to what extent brake pressure is to be distributed to brakes of the vehicle by at least one of brake wear-pressure distribution and grip-pressure distribution; and outputting control signals for setting brake pressures for at least one wheel of the vehicle.

2. The method as claimed in claim 1, wherein the data concerning frictional conditions comprises at least one of roadway measurement signals of a roadway detector configured to detect a surface of the roadway and weather measurement signals of at least one of a temperature detector configured to detect an ambient temperature, a rain detector, and a vehicle surroundings detection system including a camera for detecting fog, snow and rain.

3. A method for controlling a vehicle brake system, comprising, when a braking request signal is present, before initiating braking, using at least one data processor to determine, based on data concerning frictional conditions between a roadway surface and tire surfaces of the vehicle, to what extent brake pressure is to be distributed to brakes of the vehicle by at least one of brake wear-pressure distribution and grip-pressure distribution; and outputting control signals for setting brake pressures for at least one wheel of the vehicle, wherein the data concerning frictional conditions comprises navigation data comprising map data and global position data including data concerning at least one of roadway gradients, roadway bends, roadway status, and traffic patterns of a route section in a path of the vehicle.

4. The method as claimed in claim 1, wherein the data concerning frictional conditions comprises data relating to a status of the tire surfaces.

5. A method for controlling a vehicle brake system, comprising, when a braking request signal is present, before initiating braking, using at least one data processor to determine, based on data concerning frictional conditions between a roadway surface and tire surfaces of the vehicle, to what extent brake pressure is to be distributed to brakes of the vehicle by at least one of brake wear-pressure distribution and grip-pressure distribution, by comparing a currently determined coefficient of friction against at least one threshold, and, when the coefficient of friction is less than a first threshold, setting the grip-pressure distribution, and, when the coefficient of friction exceeds one of the first threshold and a further threshold, setting the brake wear-pressure distribution.

6. The method as claimed in claim 5, wherein the at least one threshold is a function of a route in a path of the vehicle.

7. A method for controlling a vehicle brake system, comprising, when a braking request signal is present, before initiating braking, using at least one data processor to determine, based on data concerning frictional conditions between a roadway surface and tire surfaces of the vehicle, to what extent brake pressure is to be distributed to brakes of the vehicle by at least one of brake wear-pressure distribution and grip-pressure distribution, wherein, compared to brake lining wear-pressure distribution, in grip-pressure distribution, a higher brake pressure is applied to the brakes of an axle of the vehicle to which a relatively high axle load is applied, and a lower brake pressure is applied to the brakes of an axle of the vehicle to which a relatively light axle load is applied.

8. A method for controlling a vehicle brake system, comprising, when a braking request signal is present, before initiating braking, using at least one data processor to determine, based on data concerning frictional conditions between a roadway surface and tire surfaces of the vehicle, to what extent brake pressure is to be distributed to brakes of the vehicle by at least one of brake wear-pressure distribution and grip-pressure distribution; and outputting control signals for setting brake pressures for at least one wheel of the vehicle, the determination including determining brake pressure distribution between at least one of axles and wheels of the vehicle by determining a pure grip-pressure distribution and a pure brake lining wear-pressure distribution and subsequent formation of mean values from the pure grip-pressure and pure brake lining wear-pressure distributions for at least central grip ranges.

9. The method as claimed in claim 8, wherein the mean values are formed by one of a linear function, a step function and a non-linear, continuously differentiable function.

10. A method for controlling a vehicle brake system, comprising, when a braking request signal is present, before initiating braking, using at least one data processor to determine, based on data concerning frictional conditions between a roadway surface and tire surfaces of the vehicle, to what extent brake pressure is to be distributed to brakes of the vehicle by at least one of brake wear-pressure distribution and grip-pressure distribution; before initiating braking as a function of the frictional conditions, classifying into more than two classes different proportions of grip-pressure distribution and brake wear-pressure distribution; and, in a class with a higher proportion of grip-pressure distribution and an axle to which a relatively high axle load is applied, setting a higher brake pressure than in a class with a relatively low proportion of grip-pressure distribution.

11. The method as claimed in claim 10, further comprising classifying ambient conditions into more than two classes, and, based thereon, changing a proportion of brake pressure acting on the brakes of the axle to which a heavy axle load is applied.

12. A control device for a vehicle brake system configured to effect the method as claimed in claim 1, the control device being configured to receive the braking request signal and determine a distribution of brake pressure.

13. A brake system for a vehicle, comprising the control device as claimed in claim 12; brakes at wheels of a front axle and wheels of a rear axle of the vehicle; wheel speed sensors for measuring wheel speeds; and valves for modulating brake pressure in the brakes; wherein the control device is configured to receive the braking request signal from at least one of a brake value signal transmitter and a vehicle dynamics control device, determine brake activation operations at the brakes based on the braking request signal, and output brake control signals to the valves.

14. A vehicle, comprising the brake system as claimed in claim 13.

15. A method for controlling a vehicle brake system, comprising, when a braking request signal is present, before initiating braking, using at least one data processor to determine, based on data concerning frictional conditions between a roadway surface and tire surfaces of the vehicle, to what extent brake pressure is to be distributed to brakes of the vehicle by at least one of brake wear-pressure distribution and grip-pressure distribution; and outputting control signals for setting brake pressures for at least one wheel of the vehicle, wherein the data concerning frictional conditions comprises data relating to at least one of brake lining wear, previous distance traveled, and previous braking performance of wheels of the vehicle.

* * * * *